(12) United States Patent
Lundwall et al.

(10) Patent No.: US 9,616,534 B2
(45) Date of Patent: Apr. 11, 2017

(54) MODULAR STRUCTURES FOR MOTION STAGES

(71) Applicant: INVENT-A-PART, Springville, UT (US)

(72) Inventors: Michael Lundwall, Springville, UT (US); Jerome Miles, Spanish Fork, UT (US); Randall West, San Diego, CA (US)

(*) Notice: Subject to any disclaimer, the term of this patent is extended or adjusted under 35 U.S.C. 154(b) by 654 days.

(21) Appl. No.: 14/089,483

(22) Filed: Nov. 25, 2013

(65) Prior Publication Data

US 2015/0147108 A1   May 28, 2015

(51) Int. Cl.
*B23Q 1/62* (2006.01)
*B23Q 1/01* (2006.01)

(52) U.S. Cl.
CPC ............ *B23Q 1/626* (2013.01); *B23Q 1/015* (2013.01); *Y10T 403/32229* (2015.01)

(58) Field of Classification Search
CPC ............ B29C 67/0059; B29C 67/0057; B29C 67/0085; B29C 67/008; B33Y 10/00; B33Y 30/00; B28B 1/001
See application file for complete search history.

(56) References Cited

U.S. PATENT DOCUMENTS

| | | | |
|---|---|---|---|
| 5,653,925 A | 8/1997 | Batchelder | |
| 5,866,058 A | 2/1999 | Batchelder et al. | |
| 6,004,124 A | 12/1999 | Swanson et al. | |
| 7,241,072 B2 * | 7/2007 | Patrignani | F16B 7/025 403/170 |
| 8,070,473 B2 * | 12/2011 | Kozlak | B29C 67/0051 425/135 |
| 8,349,239 B2 | 1/2013 | Hopkins et al. | |
| 2010/0207288 A1 * | 8/2010 | Dini | B28B 1/001 264/33 |

* cited by examiner

*Primary Examiner* — Daniel Wiley

(57) ABSTRACT

A modular structure includes a structural element, a rod, a knuckle, a rod mount, and a bearing holder. The knuckle is connected to a first end of the structural element and the rod mount is connected through the structural element. The bearing holder is removably connected to an actuated member and slides along the rod held by the rod mount.

20 Claims, 6 Drawing Sheets

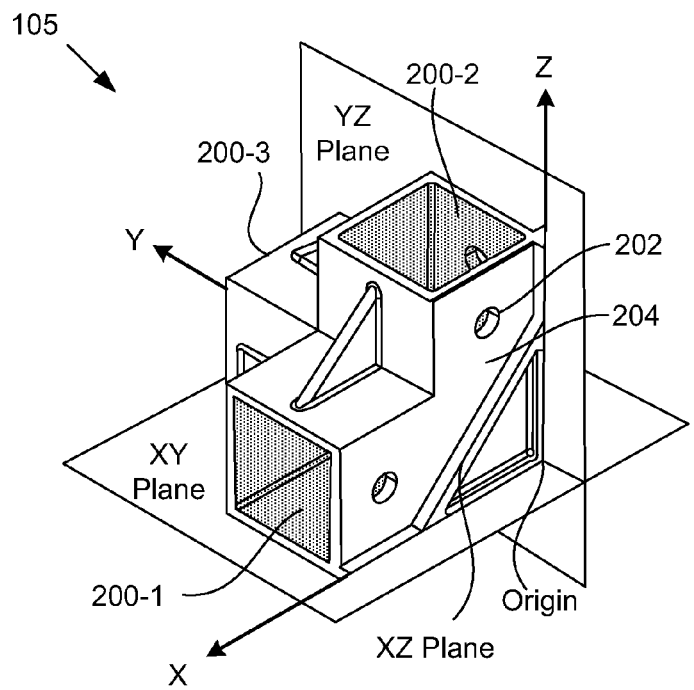
Fig. 2A
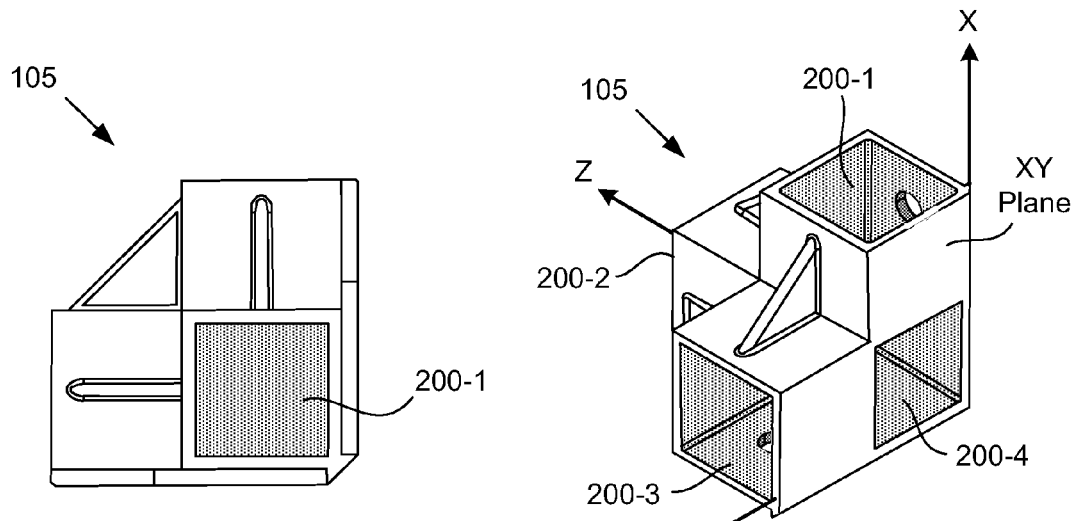
Fig. 2B
Fig. 2C

600

```
Connecting a first end of a structural element to
a knuckle
605
```
↓
```
Connecting a rod mount to the structural
element and connecting a rod to the rod mount
610
```
↓
```
Sliding a bearing connected to a bearing holder
over the rod held in the rod mount, in which the
bearing holder is removably fastened to an
actuated structure
615
```

*Fig. 6*

MODULAR STRUCTURES FOR MOTION STAGES

BACKGROUND

Motion stages are used in a variety of precise motion systems for actuation and control of location, velocity, and acceleration of components. Linear stages or translation stages can be used to restrict an object to a single axis of motion. Linear stages typically include a moving platform and a frame/base joined by a guide or linear bearing in such a way that the platform is restricted to linear motion with respect to the frame. Frames for motion stages typically exhibit high rigidity and precision to allow for stable and repeatable motion of the moving platform. An actuator, such as an electrical motor, controls the motion of the platform relative to the frame.

BRIEF DESCRIPTION OF THE DRAWINGS

The accompanying drawings illustrate various examples of the principles described herein and are a part of the specification. The illustrated examples are merely examples and do not limit the scope of the claims.

FIGS. 2A, 2B and 2C are views of a knuckle for connecting structural elements in a modular frame, according to one example of principles described herein.

FIG. 6 is a flowchart of a method for assembling modular structures for motion stages, according to one example of principles described herein.

Throughout the drawings, identical reference numbers designate similar, but not necessarily identical, elements.

DETAILED DESCRIPTION

The principles described below relate to modular structures that support one or more linear stages. In one example, the modular frame supports three orthogonal linear stages for three dimensional motion and positioning. The modular frame and linear stages could be used in a variety of applications, including additive and subtractive processes. For example, the modular frame could be used for three dimensional printing, laser marking/cutting, subtractive machining, and other processes.

The structures can be modular in several different respects. For example, the structures may be made up of several different repeated sub-parts. These sub-parts may be combined to make a frame and single motion stage or combined to form a combined device with two, three, or more stages. The frames may also be modular in that a large portion of the sub-pieces can be reused to make motion stages of varying sizes. The sub-pieces may be modular in that the functionality required by the stage is split into separate sub-pieces that can then be combined with other sub-pieces to form a range of combined devices. The sub-pieces may be modular in that they are multifunctional and can be used in a variety of different roles in the same frame.

The modularity of the frames may provide a number of advantages. The modular frames may be less expensive because they use only a relatively few different sub-parts. These sub-parts can be mass produced at a relatively low price per part. Further, the sub-parts can be combined in a number of ways to meet a range of design needs. Thus, there is no requirement to design specific parts to be custom made because the modular sub-parts can be combined to form the desired function. The modular sub-parts may also be reused in subsequent designs, which reduces wasted money and material that would result from discarding custom parts that are no longer useful.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples. Features shown and/or described in connection with one figure may be combined with features shown and/or described in connection with other figures. Further, as used in the present specification and in the appended claims, the term "a number of" or similar language is meant to be understood broadly as any positive number comprising 1 to infinity; zero not being a number, but the absence of a number.

Figure 1:
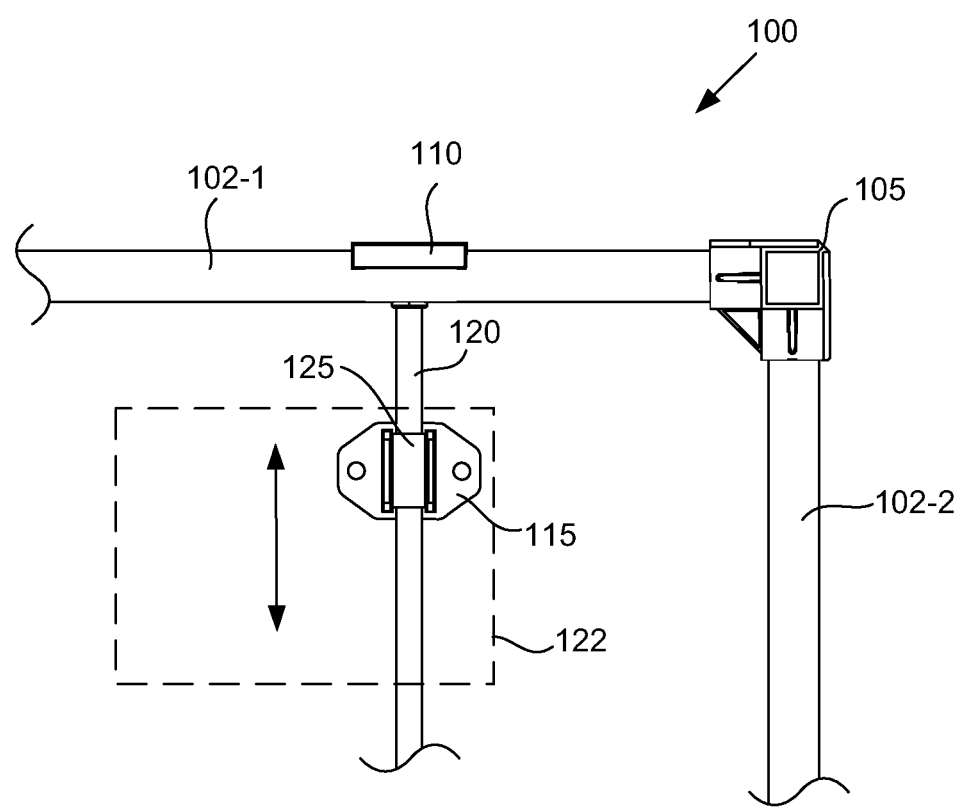
FIG. 1 is a diagram of an illustrative portion of a modular frame for a motion stage, according to one example of principles described herein.

FIG. 1 shows a portion of a modular structure (100) with its sub-parts. The modular structure (100) includes structural elements (102-1, 102-2, 120) that are joined by connectors. The structural elements may be made of any of a variety of materials and may have any suitable cross-sectional geometry. In the example shown in FIG. 1, the structural elements include square or rectangular tubing (102-1, 102-2) and a circular rod (120).

The connectors include a knuckle (105), a rod mount (110), and a bearing holder (115). As discussed below with respect to FIG. 2A-2C, the knuckle (105) is a modular corner connector that may join two, three, or four structural elements. The knuckle (105) can also serve as a connector point for panels and as a supporting base of the frame. The rod mount (110) connects one end of a rod (120) to the square tubing (102-1). One example of a rod mount is described in FIGS. 3A and 3B. The bearing holder (115) connects a platform (122) (represented by the dashed box) to a linear bearing (125) that slides along the rod (120). The motion of the linear bearing along the rod provides for linear motion of the platform (122). There may be a number of additional components used to create the modular frame and linear stage such as additional structural members, knuckles to complete the structural portion, additional rods/bearing/bearing holders to stabilize the platform. However, these additional components may be created without introducing different sub-parts. The sub-parts already described can be repeated to complete the structure.

FIG. 2A-2C are diagrams of an illustrative knuckle (105) that is designed to connect structural elements with a square end cross section. For example, the structural elements may include square metal tubing. However, the principles described herein could be used with a wide variety of different structural members.

FIG. 2A is a perspective view of a knuckle (105). For purposes of description, one corner of the knuckle is defined as origin. In this example, the knuckle (105) includes three cups (200-1, 200-2, 200-3) to receive the ends of the structural elements. The three cups (200-1, 200-2, 200-3) extend in the X, Y, and Z directions as indicated in the figure. These mutually orthogonal cups can be used to form a corner of frame.

Cups (200-1, 200-2, 200-3) may include tapered sides that gradually increase the tightness of the fit with the structural element (102, FIG. 1) as it forced into the cup. In this example, there are preformed holes (202) in at least one wall of each cup. A screw can be inserted through the hole and into the structural element inserted into the cup. This secures the structural element in the cup. Where increased precision is desired, a threaded hole in the structural element can be formed and the fastener can be placed into the through hole and threaded into the structural element.

The exterior faces of the knuckle (105) can be described using planes extending from the origin in the corner of the knuckle. For example, there may be three mutually orthogonal exterior faces of the knuckle: the XZ face, the XY face, and the YZ face. In one implementation, one or more of the faces may include an indented surface (204) to accept a corner of a cover plate or other flat sheet of material. The indentation is designed to accept the flat sheet of material with its corner removed. The flat sheet of material can be placed in the indentation and fastened to the knuckle with screws through the screw holes (204).

FIG. 2B shows a side view of the knuckle (105) with the X axis cup (200-1) pointing out of the page. FIG. 2C shows another perspective view of the knuckle (105) with the XY plane facing forward and the X axis rotating from horizontal to vertical. In this example, the knuckle includes a fourth cup (200-4) is formed in the XY plane at the intersection of the other three cups. The fourth cup (200-4) accepts an additional structural member oriented along the Z axis. In some examples, the fourth cup (200-4) may be separated from the Z cup (200-2) by a wall. In other examples, the fourth cup and Z cup may be a square through hole such that a structural element can pass all the way through the knuckle.

Figure 3A:
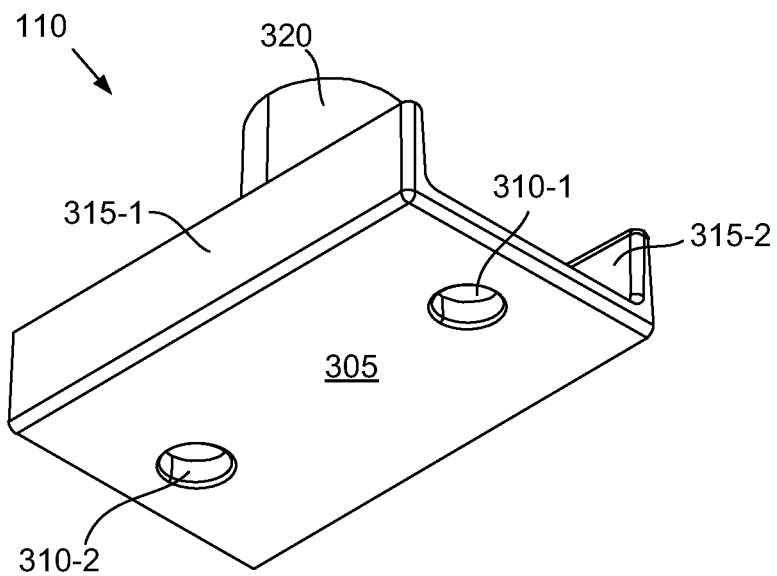
FIGS. 3A and 3B are views of a rod mount for connecting a rod to a structural element, according to one example of principles described herein.
Figure 3B:
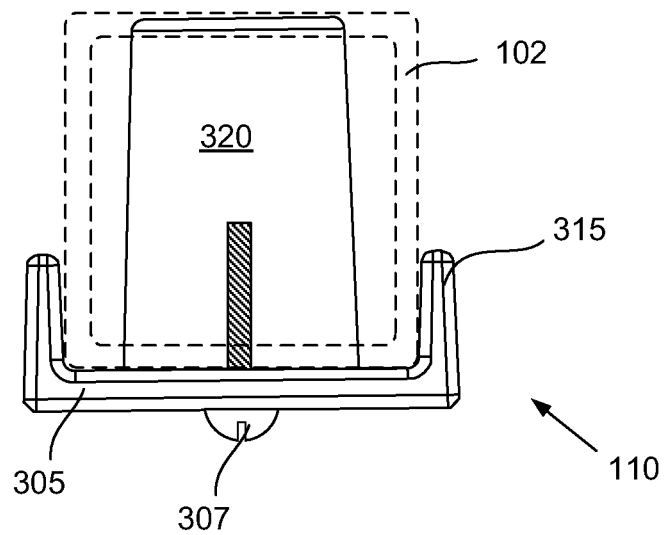

FIG. 3A shows an illustrative rod mount (110). FIG. 3A is a perspective of the rod mount and FIG. 3B is a side view of the rod mount (110). The rod mount (110) includes a base (305), sidewalls (315-1, 315-2) and a rod cup (320) extending up from the base. The rod cup (320) is configured to receive one end of a rod.

In one example, the structural element (102) is a square metal tube that includes a through hole to receive the rod cup (320). The structural element (102) is shown as a dashed outline in FIG. 3B. The inner side of the base (305) interfaces with one side of the structural element (102) and the side walls (315) extend around the structural element (102). Screws (307) can be inserted through holes (310-1, 310-2, FIG. 3A) in the base (305) and into the structural element (102). The combination of the cup (320) interfacing with the through hole in the structural element (102); the base (305) and sidewalls (315) interfacing with the structural element (102); and the screws (307) fastening the rod mount (110) to the structural element results in a very stable connection between the rod mount (110) and the structural element (102). The rod cup (320) may attach to the rod (120, FIG. 1) in a variety of ways. In one example, the rod (120, FIG. 1) is simply pressed into the rod cup (320), which is formed from a resilient polymer with an inside diameter that is slightly smaller than the outer diameter of the rod. The cup (320) expands as the rod (120, FIG. 1) is pressed into place and then grips the rod during use. When the rod (120, FIG. 1) is assembled with a rod mount (110) at each end, the rods (120, FIG. 1) are unable to back out because both of the rod mounts (110) are fastened to structural members (102).

The use of a fairly deep rod cup (320) as shown in FIGS. 3A and 3B also provides the advantage of being able to accommodate rods with slightly varying length. Longer rods extend farther into the cups and shorter rods do not extend as far into the cups, but both long and short rods are held with the required accuracy and rigidity. Fine alignment of the rods (i.e. for parallelism) can be accomplished by loosening the screws (307) and moving the rod mount slightly. In one example, the holes (310-1, 310-2) in the rod mount (110) and the openings in the structural element (102) that receive the rod cup (320) are slightly oversized. This allows the rod mount (110) to be adjusted slightly and then the screws retightened to hold the rod mount (110) in place.

Figure 4A:
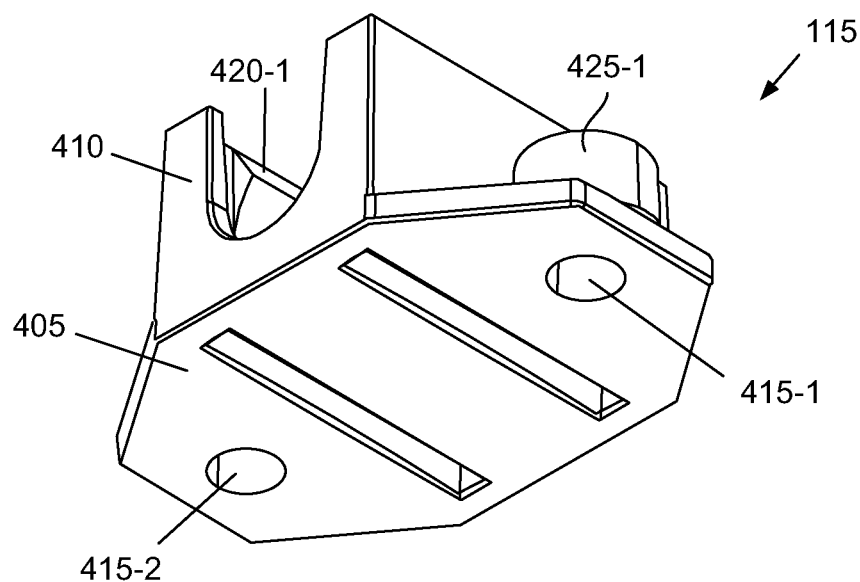
FIGS. 4A and 4B are diagrams of a bearing holder for connecting a platform or other structural element to a linear bearing sliding on a rod, according to one example of principles described herein.
Figure 4B:
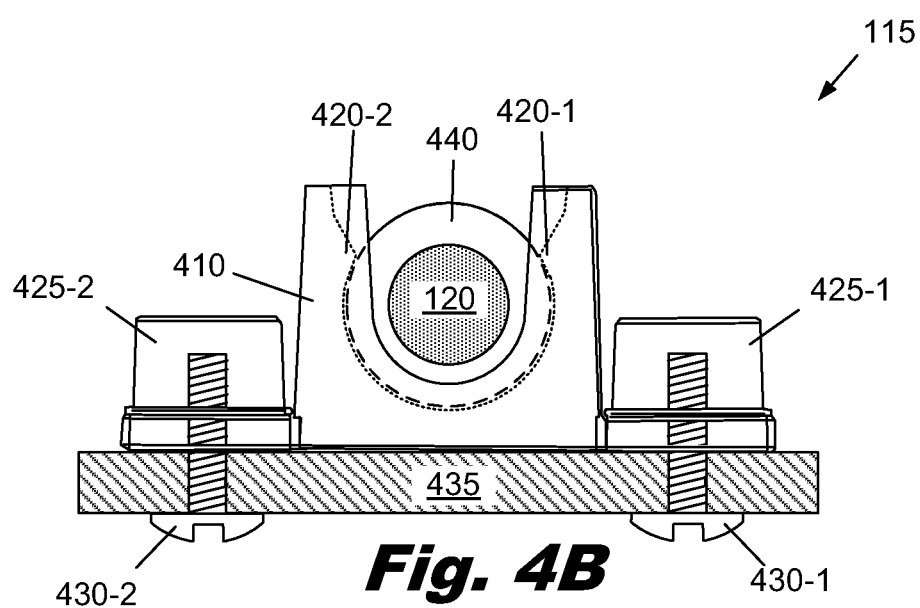

FIGS. 4A and 4B show a perspective view and a front view, respectively of one example of a bearing holder (115). The bearing holder (115) includes a base (405) and a "U" channel (410) extending upward from the base. The bearing holder (115) also includes two threaded holes (415-1, 415-2) that pass through the base and into posts (425-1). As shown in FIG. 4B, the U channel (410) is designed to receive a linear bearing (440). The linear bearing (440) is snapped into the U channel (410) by spreading apart the two arms of the U channel and forcing the linear bearing (440) into the space between the arms. Two lips (420-1, 420-2) on either side of the U channel arms hold the bearing (440) in place in the U channel. A platform (435) can be fastened to the bearing holder (115) using threaded fasteners (430-1, 430-2) that engage the threaded holes (415-1, 415-2). The platform (435) then slides along the rod (120) that passes through the linear bearing (440). The platform (435) may be connected to multiple bearing holders for additional stability. For example, when a platform (435) is connected to bearing holders that slide along two parallel rods, the platform travels linearly along the two parallel rods.

Because the bearing holders (115) are not integrated into the platform (435), they can be used with a variety of different platforms and structures. This is another example of dividing functionality between separate components to increase the modularity of the overall system. If the bearing holders (115) were integral parts of the platform (435), the manufacturing cost of the platform would be significantly increased. The platform (435) would also be limited to moving along rods with a specific diameter and spacing. By dividing the bearing holding function from the platform function, the bearing holder (115) can be used (and reused) in conjunction with a variety of different platforms. This provides additional cost savings and design flexibility.

Figure 5:
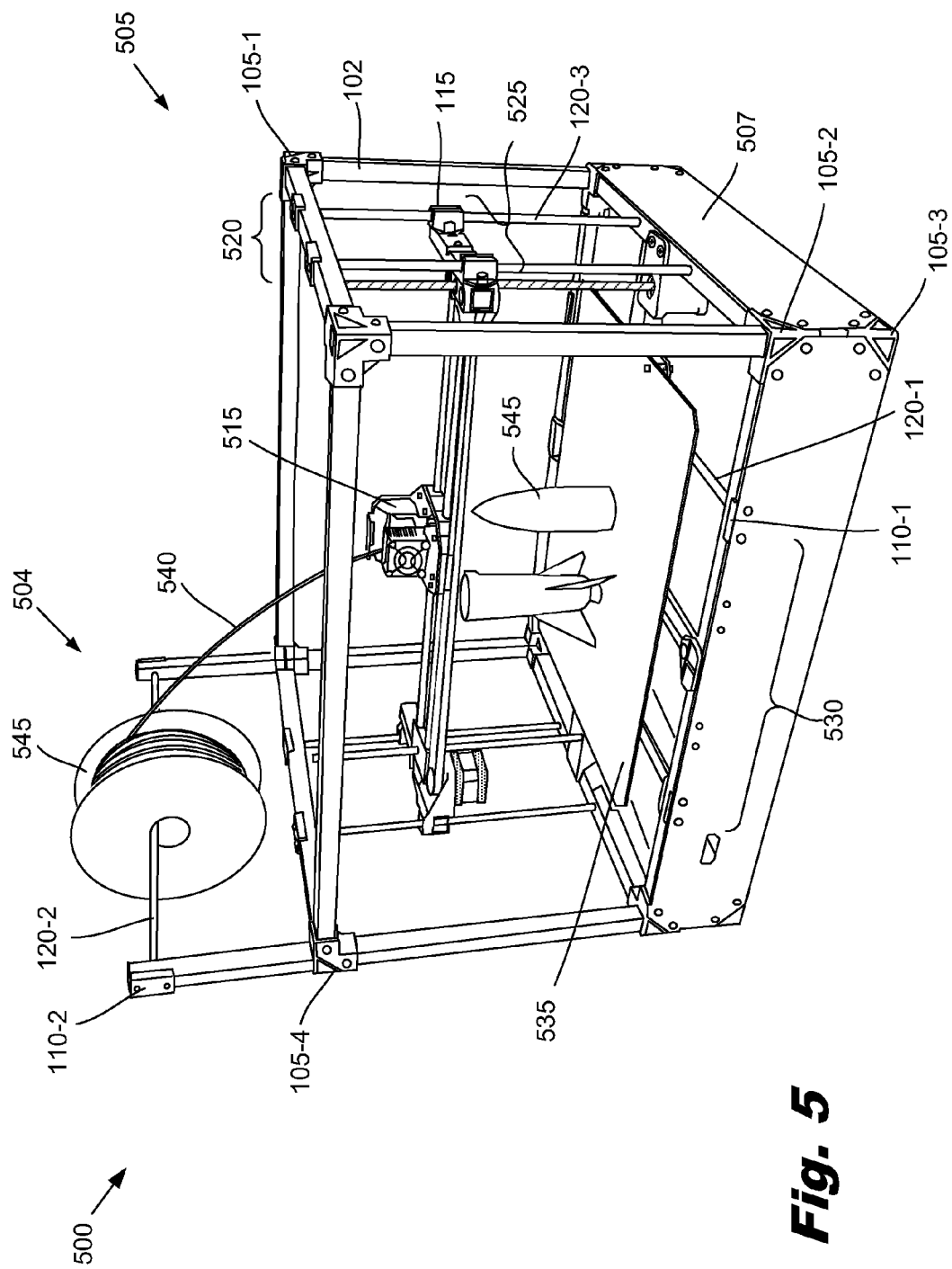
FIG. 5 is one example of a modular structure for motion stages, according to one example of principles described herein.

FIG. 5 is a perspective view of a three dimensional printer (500) that includes a modular frame (505) to support three motion axes (520, 525, 530). This printer includes a filament extruder (515) that is actuated vertically (in the Z direction) by the vertical axis (520) and in the X direction by the X horizontal axis (525). The build platform (535) is actuated in the Y direction by the Y horizontal axis (530). The combination of the three orthogonal axes allows the filament extruder (515) to move through a three dimensional volume with respect to the build platform (535) to create a variety of printed objects (545). The printing material in this example is a polymer filament (540) that is fed off of a roll (545) into the filament extruder (515). A feed mechanism in the extruder (515) feeds the filament (540) into an extrusion head. The extrusion head melts the filament and dispenses the material to progressively produce the desired object.

The modular frame (505) in this example includes 12 knuckles (105-1, 105-2, 105-3 and 105-4). For clarity, only a few of the knuckles are numbered in the figure. Upper knuckles (105-1, 105-4) are connected to three structural elements (102) and form the upper corners of the modular frame. The upper knuckles on the left (105-4) are also connected to the uprights of the reel stand (504). The middle knuckles (105-2) are used to join additional horizontal structural elements to the corners of the frame. The lower knuckles (105-3) form the lower corners of the frame. The lower knuckles are oriented so that their flat plane (XY plane; FIG. 2A, 2C) is down and rests on the support surface. This provides a stable support for the three dimensional printer. The middle and lower knuckles (105-2, 105-3) also have covers (507) connected to them. The covers (507) provide a number of advantages, including safety, aesthetics, and additional shear strength to the frame.

A number of rods (120-1, 120-2, 120-3) can be supported by the modular frame. In this example there are nine rods: two for the Y horizontal axis (530), four for the vertical Z axis (520), two for the X horizontal axis (525) and one rod (120-2) for the reel stand. Each end of these nine rods is supported by a rod mount (110-1, 110-2). For clarity, only a few of the rods and rod mounts are numbered in the figure. Most of the rods also support motion of an actuated structure (i.e. the build platform (535), the extruder (515), the structure supporting the extruder and the X horizontal axis). However, the rods and rod mounts may be used for a variety of purposes, such as the reel stand (504).

Where the rods (120-3) are used to support actuated structures, bearing holders (115) are connected to bearings that slide along the rods. In this example, there may be at least 11 bearings/bearing holders: four to support the build platform (535) as it moves in the Y horizontal axis (530), four to support the motion of the vertical axis (520), and three to support the motion of the extruder (515) along the X horizontal axis (525).

Modification of the modular frame (505) can be easily accomplished and most of the components reused. For example, to expand or reduce the size of the three dimensional printer (500), structural elements and rods with different length can be obtained. These new structural elements can replace some of the existing structural elements (102). All of the knuckles (105), rod mounts (110), and bearing holders (115) can be reused if desired.

FIG. 6 is a flow chart of a method for forming a modular structure for a motion stage. The method includes connecting a first end of a structural element to a knuckle (step 605). As discussed above, the knuckle may have a variety of shapes and be configured to join two or more structural elements together. The structural element may have a variety of geometric shapes and cross sections. For example, the structural element may have a rectangular or square cross section.

A rod mount is connected to the structural element and a rod is connected to the rod mount (step 610). For example, a base of the rod mount may be mounted to one side of the structural element and a rod cup of the rod mount may extend through the structural element so that a rod extends out of an opposite side of the structural element.

A bearing is placed over the rod, and a bearing holder is connected to the bearing. Alternatively, the bearing holder may be connected to the bearing prior to sliding the bearing over the rod. The bearing holder is then removably fasted to an actuated structure (step 615).

The actuated structures may each slide along multiple rods and be connected to multiple linear bearings and bearing holders to produce the desired stability. The steps described above can be reordered, combined, repeated, removed or additional steps may be added. For example, the steps above can be repeated to produce a modular frame that supports motion of a desired number of actuated structures. In one method, the structural elements in the modular frame are first connected to the knuckles. After all of the structural elements are in place, the rod mounts, bearings, and rods can be connected to the structural members. The bearing holders can be snapped over the bearings and the actuated structures (platforms, etc.) can then be connected to the bearing holders. An example of an additional step that could be added to the method described above is the fastening of covers or panels to the knuckles.

In sum, the modular frame described herein includes a number of repeated sub-parts. These sub-parts may be economically combined to make a modular frame that supports any number of motion stages. The frames are also modular in that a large portion of the sub-pieces can be reused to make new motion stages of varying sizes. The sub-pieces are modular in that the functionality required by the stage is split into separate sub-pieces that can then be combined with other sub-pieces to form a range of combined devices. The sub-pieces may be modular in that they are multifunctional and can be used to in variety of different roles in the same frame.

The modularity of the frames may provide a number of advantages. The modular frames may be less expensive because they use only a relatively few different sub-parts. These sub-parts can be mass produced at a relatively low price per part. Further, the sub-parts can be combined in a large number of ways to meet a range of design needs. Thus, there is no requirement to design specific parts to be custom made because the modular sub-parts can be combined to form the desired function. The modular sub-parts may also be reused in subsequent designs.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A modular structure comprising:
   a structural element;
   a rod;
   a knuckle;
   a rod mount; and
   a bearing holder;
   in which the knuckle is connected to a first end of the structural element and the rod mount is connected through the structural element and wherein the bearing holder is removably connected to an actuated member and slides along the rod held by the rod mount.

2. The structure of claim 1, wherein the knuckle comprises attachment cups to accept and join up to four structural elements.

3. The structure of claim 2, wherein the knuckle forms a corner of a rectangular modular frame.

4. The structure of claim 2, further comprising the four structural elements, which are connected to the knuckle in three orthogonal directions: an X direction, a Y direction, and a Z direction.

5. The structure of claim 1, wherein at least one of an XY surface, a YZ surface, and an XZ surface of the knuckle is configured to sit flat against a support surface.

6. The structure of claim 1, wherein the knuckle comprises an indentation in at least one exterior surface of the knuckle to accept a cover panel.

7. The structure of claim 1, wherein the knuckle comprises a through hole in a wall of each of the attachment cups.

8. The structure of claim 1, wherein the structural element comprises a fastener hole, wherein the attachment cups comprise tapered walls such that as the structural elements are inserted into the cups an interference fit of the structural element in the attachment cups becomes increasingly tight.

9. The structure of claim 8, wherein a through hole in the knuckle and the fastener hole in the structural element align when the structural element reaches a predetermined depth in the attachment cups.

10. The structure of claim 1, wherein three structural elements are configured to connect to the knuckle in three orthogonal directions and a fourth structural element is to connect in line with one of the three orthogonal directions.

11. The structure of claim 1, wherein the rod mount comprises a rod cup connected to a base, in which the rod cup is configured to accept and hold a rod, in which the rod cup is placed through a hole in the structural element and the base is fastened to an exterior surface of the structural member.

12. The structure of claim 11, wherein the rod mount further comprises sidewalls extending from the base, wherein the sidewalls are configured to fit around the structural element.

13. The structure of claim 11, wherein the base is fastened to a first side of the structural element and the rod extends out of a second opposite side of the structural element.

14. The structure of claim 1, wherein the bearing holder is configured to snap over a linear bearing.

15. The structure of claim 1, wherein the bearing holder comprises two mutually opposing jaws to snap over a cylindrical linear bearing; wherein the bearing holder is configured to snap over only one cylindrical linear bearing and to be individually connected to the actuated member.

16. The structure of claim 15, wherein the rod extending through the structural element passes through the cylindrical linear bearing such that motion of the actuated member is constrained by the cylindrical linear bearing sliding over the rod.

17. The structure of claim 1, wherein both ends of the structural element are connected to a different knuckle.

18. A method for forming a modular structure for a motion stage, the method comprising:
connecting a first end of a structural element to a knuckle;
connecting a rod mount to the structural element;
sliding a bearing connected to a bearing holder over a rod held in the rod mount, in which the bearing holder is removably fastened to an actuated structure.

19. A kit for constructing a modular frame for a three dimensionally actuated device, the kit comprising:
at least one structural element having a first end, a second end, and a through hole;
at least one knuckle for connecting up to four structural elements;
at least one rod mount to extend through the structural element to secure a rod to the structural element; and
at least one bearing holder to hold a bearing sliding along the rod and to individually and separately connect to a moving structure.

20. A modular structure comprising:
a plurality of metal tubes with a rectangular hollow cross section;
at least two rods;
a plurality of identical knuckles, each knuckle comprising:
four attachment cups, each configured to receive an end of a metal tube, wherein the each of the attachment cups comprises:
tapered walls such that as the metal tube are inserted into the cups an interference fit of the structural element in the attachment cups becomes increasingly tight; and
a through hole in at least one of the tapered walls;
an indentation in at least one exterior surface of each knuckle to receive a panel;
at least four rod mounts, wherein each rod mount comprises:
a base;
sidewalls extending from the base, wherein the sidewalls are configured to fit around the structural element;
a rod cup connected to the base, in which the rod cup is configured to accept and hold a rod, in which the cylinder is placed through a hole in the metal tube and the base is fastened to an first exterior surface of the metal tube and the rod extends out of a second exterior surface of the metal tube;
cylindrical linear bearings; and
at least three bearing holders, wherein the bearing holders each comprise two mutually opposing jaws to snap over one of the cylindrical linear bearings and to be individually connected to a platform; wherein the at least three bearing holders are connected to the platform and connected to the cylindrical linear bearings, wherein the cylindrical linear bearings slide on the at least two rods.

* * * * *